United States Patent
Tang

(10) Patent No.: US 11,188,961 B2
(45) Date of Patent: Nov. 30, 2021

(54) SERVICE EXECUTION METHOD AND DEVICE

(71) Applicant: Advanced New Technologies Co., Ltd., Grand Cayman (KY)

(72) Inventor: Qiang Tang, Chengdu (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/664,020

(22) Filed: Oct. 25, 2019

(65) Prior Publication Data
US 2020/0065872 A1 Feb. 27, 2020

Related U.S. Application Data

(63) Continuation of application No. PCT/CN2018/087595, filed on May 21, 2018.

(30) Foreign Application Priority Data

May 22, 2017 (CN) .......................... 201710362177.X

(51) Int. Cl.
*G06Q 30/06* (2012.01)
*G06Q 30/00* (2012.01)

(52) U.S. Cl.
CPC ..... *G06Q 30/0609* (2013.01); *G06Q 30/0185* (2013.01)

(58) Field of Classification Search
CPC ................. G06Q 30/0609; G06Q 30/0185
See application file for complete search history.

(56) References Cited

U.S. PATENT DOCUMENTS

| 2012/0030048 | A1* | 2/2012 | Manley | G06Q 20/02 705/26.1 |
| 2012/0220362 | A1* | 8/2012 | Farah | G07F 17/329 463/25 |

(Continued)

FOREIGN PATENT DOCUMENTS

| CN | 105096132 | 11/2015 |
| CN | 105931052 | 9/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Steven S Kim
*Assistant Examiner* — Nilesh B Khatri
(74) *Attorney, Agent, or Firm* — Fish & Richardson P.C.

(57) ABSTRACT

This specification describes techniques for executing services. One example method includes receiving, by a service platform, a qualification acquisition request from a first end-user device of several end-user devices that participate in a service qualification activity corresponding to a service; returning a qualification acquisition rule and a result generation rule that are based on the qualification acquisition request to the first end-user device to enable the first end-user device to generate a to-be-verified result corresponding to the result generation rule; in response to a determination that the service satisfies the predetermined condition, obtaining the blockchain corresponding to the service from at least one end-user device of the plurality of end-user devices; selecting, from the blockchain, at least one block that satisfies the qualification acquisition rule; and (Continued)

executing the service for a user that corresponds to a user identifier included in the at least one block.

18 Claims, 6 Drawing Sheets

(56) References Cited

U.S. PATENT DOCUMENTS

| | | | |
|---|---|---|---|
| 2013/0005438 A1* | 1/2013 | Ocko | H04W 4/21 463/25 |
| 2013/0060641 A1* | 3/2013 | Al Gharabally | H04H 60/63 705/14.66 |
| 2013/0254007 A1 | 9/2013 | Cockcroft | |
| 2014/0032322 A1* | 1/2014 | Schwieger | G06Q 30/02 705/14.55 |
| 2015/0039427 A1* | 2/2015 | Elbouchikhi | G06Q 30/0255 705/14.53 |
| 2016/0189191 A1 | 6/2016 | Spalding | |
| 2017/0005804 A1* | 1/2017 | Zinder | H04L 63/123 |
| 2017/0031676 A1 | 2/2017 | Cecchetti et al. | |
| 2017/0048234 A1 | 2/2017 | Lohe et al. | |
| 2017/0132619 A1 | 5/2017 | Miller et al. | |
| 2017/0309117 A1 | 10/2017 | Clemenson | |
| 2018/0025435 A1* | 1/2018 | Karame | H04L 9/3236 705/30 |
| 2018/0121909 A1* | 5/2018 | Christidis | H04L 9/3236 |

FOREIGN PATENT DOCUMENTS

| | | |
|---|---|---|
| CN | 106204287 | 12/2016 |
| CN | 106504174 | 3/2017 |
| CN | 106603461 | 4/2017 |
| CN | 107392623 | 11/2017 |
| JP | 2002288502 | 10/2002 |
| JP | 2002335240 | 11/2002 |
| JP | 6042011 | 12/2016 |
| KR | 20130110950 | 10/2013 |
| KR | 101372854 | 3/2014 |
| WO | WO 2016022864 | 2/2016 |
| WO | WO 2016127721 | 8/2016 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2018/087595, dated Nov. 26, 2019, 10 pages (with English translation).

PCT International Search Report and Written Opinion in International Application No. PCT/CN2018/087595, dated Aug. 17, 2018, 14 pages (with English translation).

Extended European Search Report in European Application No. 18805639.4, dated Dec. 30, 2019, 12 pages.

Toporkov et al., "Job Ranking and Scheduling in Utility Grids VOs," Jul. 25, 2015, ICIAP: International Conference on Image Analysis and Processing, 17th International Conference, Naples, Italy, Sep. 9-13, 2013. Proceedings; [Lecture Notes in Computer Science; Lect. Notes Computer], Springer, Berlin, Heidelberg, 285-97.

* cited by examiner

SERVICE EXECUTION METHOD AND DEVICE

CROSS-REFERENCE TO RELATED APPLICATIONS

This application is a continuation of PCT Application No. PCT/CN2018/087595, filed on May 21, 2018, which claims priority to Chinese Patent Application No. 201710362177.X, filed on May 22, 2017, and each application is hereby incorporated by reference in its entirety.

TECHNICAL FIELD

The present application relates to the field of computer technologies, and in particular, to a service execution method and device.

BACKGROUND

With the continuous development of computer technologies, a service platform can provide a plurality of service models for users. In these service models, some service models are emerging. In addition to new user experience, these emerging service models bring more convenience to users' daily life.

Currently, in some emerging service models, some flash sale services are particularly popular. In a certain time period, people usually can contend for qualification for executing these services at low prices.

For example, in a commodity limited-time-offer service, each user can send, in a time period specified for a commodity limited-time-offer activity, a commodity limited-time-offer qualification acquisition request to a service platform that provides the commodity limited-time-offer activity. The service platform selects a specified number of users from users who send commodity limited-time-offer qualification acquisition requests, and grants the commodity limited-time-offer qualification to these selected users. Generally, the service platform determines the first several users who send commodity limited-time-offer qualification acquisition requests as users who can obtain the commodity limited-time-offer qualification. Certainly, after the commodity limited-time-offer activity starts, the service platform can first continuously receive commodity limited-time-offer qualification acquisition requests sent by users. When a deadline for receiving the commodity limited-time-offer qualification acquisition requests expires, the service platform can randomly select a certain number of users from the users who send the commodity limited-time-offer qualification acquisition requests in the time period as users who obtain the commodity limited-time-offer qualification, and publish the determined users who obtain the commodity limited-time-offer qualification.

However, for the flash sale service described above, the users who obtain the qualification for executing the service and are published by the service platform to each user usually lack credibility. It is usually difficult for the service platform to prove that the service platform fairly and effectively determines the users who obtain the qualification for executing the service. From a user's perspective, the user may suspect that the service platform commits fraud in the process of determining the users who obtain the qualification for executing the service. Therefore, a result published by the service platform is usually unconvincing for the user. How to provide an effective and fair mechanism between the service platform and users to ensure that a result published by the service platform can convince the users is an urgent problem to be alleviated.

SUMMARY

An implementation of the present application provides a service execution method to alleviate the lack of credibility in a service execution process in the existing technology.

An implementation of the present application provides a service execution method, including the following: receiving, by a service platform, a qualification acquisition request sent by an end-user device for a service; returning a qualification acquisition rule and a result generation rule to the end-user device based on the qualification acquisition request so that the end-user device generates a to-be-verified result corresponding to the result generation rule, performs consensus processing on a preprocessing block that includes the to-be-verified result and a user identifier, and writes the preprocessing block as a blockchain block to a blockchain after a consensus is reached; when determining that the service satisfies a predetermined condition, obtaining a blockchain from at least one end-user device, and selecting at least one block that satisfies the qualification acquisition rule from the blockchain; and executing the service for a user that corresponds to a user identifier included in the at least one block.

An implementation of the present application provides a service execution device to alleviate the lack of credibility in a service execution process in the existing technology.

An implementation of the present application provides a service execution device, including the following: a receiving module, configured to receive a qualification acquisition request sent by an end-user device for a service; a return module, configured to return a qualification acquisition rule and a result generation rule to the end-user device based on the qualification acquisition request so that the end-user device generates a to-be-verified result corresponding to the result generation rule, performs consensus processing on a preprocessing block that includes the to-be-verified result and a user identifier, and writes the preprocessing block as a blockchain block to a blockchain after a consensus is reached; an acquisition module, configured to: when determining that the service satisfies a predetermined condition, obtain a blockchain from at least one end-user device, and select at least one block that satisfies the qualification acquisition rule from the blockchain; and an execution module, configured to execute the service for a user that corresponds to a user identifier included in the at least one block.

An implementation of the present application provides a service execution method to alleviate the lack of credibility in a service execution process in the existing technology.

An implementation of the present application provides a service execution method, including the following: sending, by an end-user device, a qualification acquisition request to a service platform for a service; receiving a qualification acquisition rule and a result generation rule that are returned by the service platform based on the qualification acquisition request; generating a corresponding to-be-verified result according to the result generation rule; generating a preprocessing block that includes the to-be-verified result and a user identifier, and sending the preprocessing block to another end-user device so that the another end-user device performs consensus processing on the preprocessing block; writing the preprocessing block as a blockchain block to a blockchain of the end-user device after determining that the another end-user device reaches a consensus on the preprocessing block; and sending the blockchain saved by the end-user device to the service platform when receiving qualification confirmation information sent by the service platform, so that the service platform selects at least one block that satisfies the qualification acquisition rule from the blockchain, and executes the service for a user that corresponds to a user identifier included in the at least one block.

An implementation of the present application provides a service execution method to alleviate the lack of credibility in a service execution process in the existing technology.

An implementation of the present application provides a service execution device, including the following: a sending module, configured to send a qualification acquisition request to a service platform for a service; a first receiving module, configured to receive a qualification acquisition rule and a result generation rule that are returned by the service platform based on the qualification acquisition request; a result generation module, configured to generate a corresponding to-be-verified result according to the result generation rule; a preprocessing block generation module, configured to generate a preprocessing block that includes the to-be-verified result and a user identifier, and send the preprocessing block to another end-user device so that the another end-user device performs consensus processing on the preprocessing block; a write module, configured to write the preprocessing block as a blockchain block to a blockchain included in the device after it is determined that the another end-user device reaches a consensus on the preprocessing block; and a second receiving module, configured to send the blockchain saved by the device to the service platform when receiving qualification confirmation information sent by the service platform, so that the service platform selects at least one block that satisfies the qualification acquisition rule from the blockchain, and executes the service for a user that corresponds to a user identifier included in the at least one block.

At least one of the previously described technical solutions used in the implementations of the present application can achieve the following beneficial effects:

In the implementations of the present application, after receiving a qualification acquisition request sent by each end-user device for the service, the service platform can return the qualification acquisition rule and the result generation rule to each end-user device. Each end-user device can generate a corresponding to-be-verified result according to the result generation rule returned by the service platform, then add the to-be-verified result and a user identifier of a user who uses the end-user device to a preprocessing block, and send the preprocessing block to another end-user device, and write the preprocessing block as a blockchain block to a blockchain that corresponds to the service and that is saved by the end-user device, after determining that the another end-user device reaches a consensus on the preprocessing block. When determining a user who can obtain the qualification for executing the service, the service platform can obtain a blockchain corresponding to the service from at least one end-user device, determine, based on the obtained blockchain, a block that satisfies the qualification acquisition rule, and then execute, based on a user identifier included in the block, the service for the user corresponding to the user identifier. Because each end-user device can write the to-be-verified result generated according to the result generation rule to the blockchain corresponding to the service, each end-user device can use the blockchain that corresponds to the service and that is saved by the end-user device to view a block generated by another end-user device. In addition, the service platform can send the qualification acquisition rule for obtaining the qualification for executing the service to each end-user device so that the end-user device can verify, based on the obtained qualification acquisition rule and the blockchain that corresponds to the service and that is saved by the end-user device, a user identifier of a user who can execute the service and who is determined by the service platform. For a user, the service platform can be effectively prevented from committing fraud in the process of determining the user who can obtain the qualification for executing the service, thereby protecting user rights and interests. For the service platform, an effective verification method is provided for the user, thereby improving the credibility of the service platform.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
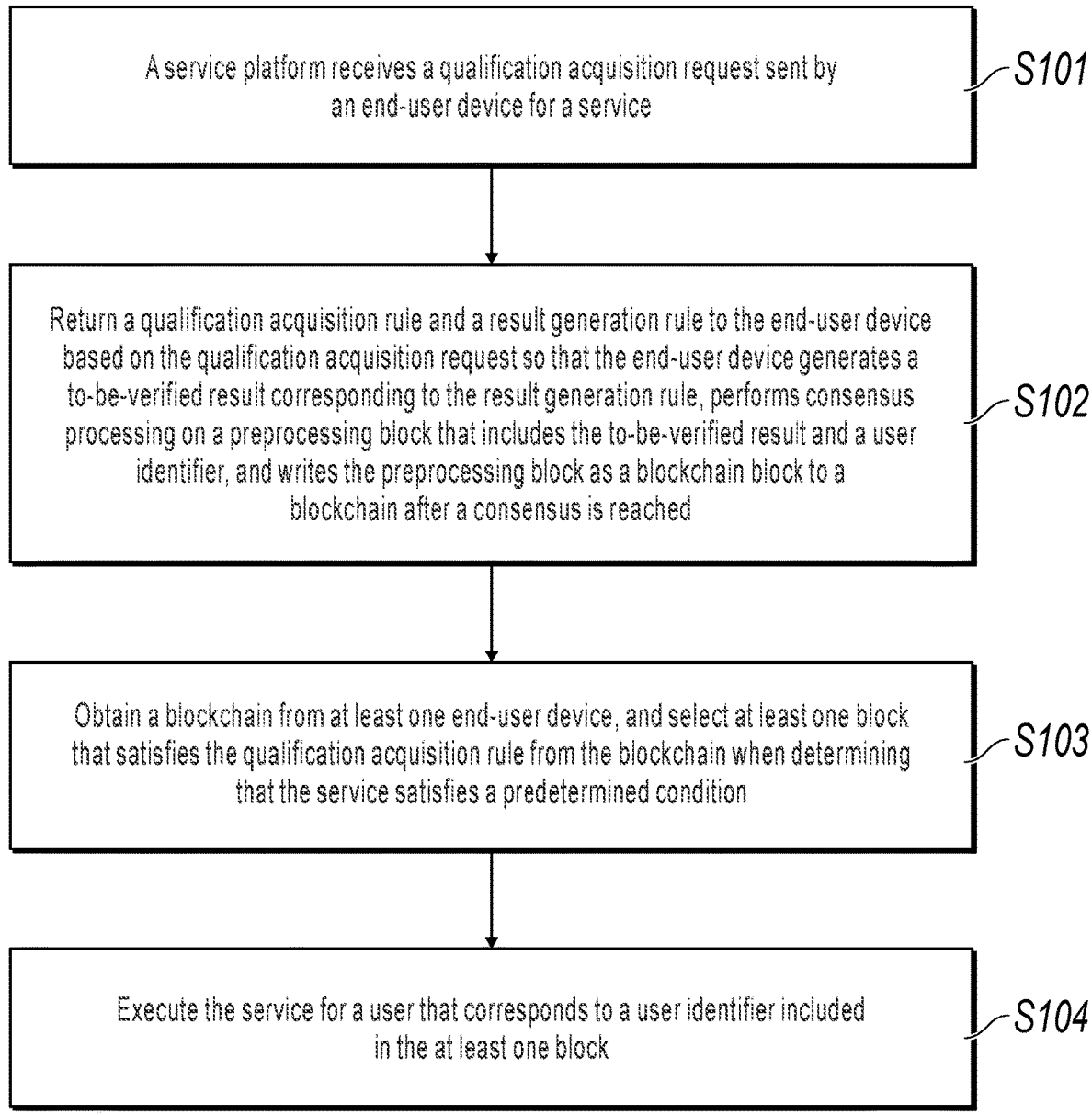
FIG. 1 is a schematic diagram illustrating a service execution process, according to an implementation of the present application.

FIG. 1 is a schematic diagram illustrating a service execution process, according to an implementation of the present application. The service execution process includes the following steps.

S101. A service platform receives a qualification acquisition request sent by an end-user device for a service.

In the present implementation of the present application, each user can send a qualification acquisition request for executing the service to the service platform by using an end-user device held by the user. The user can send the qualification acquisition request for executing the service to the service platform by using the end-user device when viewing information, published by the service platform, about the start of a service qualification acquisition activity. Alternatively, the service platform can send prompt information to the end-user device of the user when a service qualification acquisition activity starts, and the end-user device can send the qualification acquisition request to the service platform after receiving the prompt information. Alternatively, the service platform can send prompt information to the end-user device of the user in a specified time period before a service qualification acquisition activity starts, where the prompt information indicates that the service qualification acquisition activity is about to start, so that the end-user device of the user sends the qualification acquisition request for executing the service to the service platform when detecting that the start time of the service qualification acquisition activity arrives.

The previously mentioned start time of the service qualification acquisition activity can be understood as a time at which the service platform allows a user to send a qualification acquisition request for executing the service to the service platform. For example, assume that a commodity limited-time-offer activity (namely, a service) starts at 8:00 a.m. A user can send a commodity limited-time-offer qualification acquisition request to the service platform when 8:00 a.m. arrives, where 8:00 a.m. is the start time of the service qualification acquisition activity.

Certainly, in the present implementation of the present application, the user can send the qualification acquisition request to the service platform by using client software installed on the end-user device. For example, the end-user device can start the client software when detecting that the user performs a specified operation on the client software (for example, when detecting that the user taps the icon of the client software or when receiving voice information for starting the client software from the user), so that the client software displays an operation interface to the user. The user can edit a corresponding qualification acquisition request on the operation interface when discovering, on the operation interface, that the service qualification acquisition activity starts. The client software can generate a corresponding qualification acquisition request when detecting that the user performs a specified input operation on the operation interface, and send the qualification acquisition request to the service platform by using the end-user device when detecting that the user performs a specified operation for sending the qualification acquisition request to the service platform. Correspondingly, the service platform can receive the qualification acquisition request sent by the end-user device.

S102. Return a qualification acquisition rule and a result generation rule to the end-user device based on the qualification acquisition request.

After receiving the qualification acquisition request sent by the end-user device, the service platform can determine the service corresponding to the qualification acquisition request, and then return the qualification acquisition rule and the result generation rule that correspond to the service to the end-user device.

After receiving the qualification acquisition request, the service platform can further determine a service identifier included in the qualification acquisition request, and further determine, based on the determined service identifier, the service corresponding to the qualification acquisition request.

In the present implementation of the present application, different services can correspond to different qualification acquisition rules and result generation rules, and the qualification acquisition rule specifies how a user can obtain service execution qualification. For example, a qualification acquisition rule corresponding to a commodity limited-time-offer service specifies a block satisfying the qualification acquisition rule in a blockchain that corresponds to the service and that is subsequently saved by each end-user device. In other words, the qualification acquisition rule specifies a user who participates in a qualification acquisition activity of the service and who generates, by using end-user devices, a block that satisfies the qualification acquisition rule.

The qualification acquisition rule can directly specify the block that satisfies the qualification acquisition rule in the blockchain corresponding to the service. For example, the qualification acquisition rule can directly specify that the fourth block, the 58th block, the 123rd block, and the 356th block in the blockchain corresponding to the service satisfy the qualification acquisition rule. In other words, users who generate the four blocks by using end-user devices can obtain qualification for executing the service.

The qualification acquisition rule can alternatively specify a condition for determining the block that satisfies the qualification acquisition rule in the blockchain. For example, assume that the qualification acquisition rule specifies that a block whose sorting number in the blockchain is a multiple of 16 satisfies the qualification acquisition rule. Therefore, for a blockchain that includes 160 blocks, the 16th block, the 32nd block, the 48th block, the 64th block, the 80th block, the 96th block, the 112nd block, the 128th block, the 144th block, and the 160th block satisfy the qualification acquisition rule.

Alternatively, the qualification acquisition rule can specify another form of condition for determining the block that satisfies the qualification acquisition rule in the blockchain corresponding to the service. Examples are not described here. In the present implementation of the present application, the qualification acquisition rule can alternatively specify, in a time dimension, the blocks that satisfy the qualification acquisition rule in the blockchain corresponding to the service.

For example, assume that the qualification acquisition rule corresponding to the service specifies that blocks generated in the following three time periods satisfy the qualification acquisition rule: 07:45:45 to 07:46:45, 07:50:30 to 07:51:30, and 08:00:28 to 08:01:28. Therefore, in the blockchain corresponding to the service, only blocks whose generation times fall within the three time periods satisfy the qualification acquisition rule. In other words, a user can obtain the qualification for executing the service, when the generation time of a block that is generated by the user by using an end-user device and that is written to the blockchain corresponding to the service falls within the three time periods.

Certainly, the qualification acquisition rule can specify, in a time dimension other than the generation time of a block, the block that satisfies the qualification acquisition rule. For example, the qualification acquisition rule can specify that a block generated at a time whose difference from the generation time of a previous block is less than a specified time satisfies the qualification acquisition rule. Alternatively, when the sum of generation times of a specified number of consecutive blocks is less than a specified time, these blocks satisfy the qualification acquisition rule. In addition, the qualification acquisition rule can specify, in another time dimension, a condition for determining the block that satisfies the qualification acquisition rule. Examples are not described here.

The qualification acquisition rule can specify, in a dimension other than the time dimension, the block that satisfies the qualification acquisition rule. For example, each block in the blockchain corresponding to the service includes a user identifier. The user identifier (such as a user account or an identity card number) is used by a user to generate a block by using an end-user device. Therefore, the qualification acquisition rule can specify that a block whose user identifier satisfies a specified condition in the blockchain satisfies the qualification acquisition rule.

The qualification acquisition rule can specify, in a dimension other than the previous dimensions, the block that satisfies the qualification acquisition rule. Examples are not described here.

In the present implementation of the present application, the service platform can further return the result generation rule to the end-user device in addition to the corresponding qualification acquisition rule after receiving the qualification acquisition request sent by the end-user device. The result generation rule can vary depending on the service. The result generation rule can specify how the end-user device generates a preprocessing block that is to be sent to another end-user device for a consensus.

Generally, the result generation rule can be determined based on a proof of work (POW). In other words, the result generation rule can specify that the end-user device needs to generate, through calculation, a to-be-verified result that satisfies a specified condition. For example, assume that the result generation rule specifies that the end-user device needs to obtain a value (the value is the to-be-verified result), and the specified condition that the value needs to satisfy is that after hash conversion is performed on the value, the first six bits of an obtained string of hash value should be 0. Therefore, the another end-user device can subsequently reach a consensus on the value obtained by the end-user device when the first six bits of the hash value that is obtained after the hash conversion is performed on the value obtained by the end-user device are 0. Certainly, the result generation rule can be determined in another way. Examples are not described here.

It is worthwhile to note that in the present implementation of the present application, for the same service, the service platform can send a different result generation rule to end-user devices each time a qualification acquisition activity (the qualification acquisition activity here refers to a process from starting to receive, by the service platform, a qualification acquisition request sent by an end-user device to starting to determine a user who can obtain the qualification for executing the service) of the service starts. For example, assume that the service platform holds a plurality of limited-time-offer activities for the same commodity (namely, the same service). The service platform may send a different result generation rule to end-user devices for each limited-time-offer activity of the commodity. In other words, each limited-time-offer activity of the commodity corresponds to one result generation rule, and each limited-time-offer activity can correspond to a different result generation rule.

In the present implementation of the present application, a result generation rule corresponding to each activity (for the same service) can be set by an operation and maintenance personnel of the service platform based on an actual need, or can be set by the service platform. The service platform can set the result generation rule based on an average generation time of blocks in a blockchain (a blockchain corresponding to the service) in a previous service qualification acquisition activity.

For example, if the service platform finds that the average generation time of the blocks in the blockchain in the previous service qualification acquisition activity is too long, a difficulty of obtaining, by an end-user device, a value that satisfies the specified condition can be appropriately reduced, where the difficulty is specified in the result generation rule corresponding to the present service. If the service platform finds that the average generation time of the blocks in the blockchain in the previous service qualification acquisition activity is too short, a difficulty of obtaining, by an end-user device, a value that satisfies the specified condition can be appropriately increased, where the difficulty is specified in the result generation rule corresponding to the present service.

The service platform can adjust the result generation rule corresponding to the present service qualification acquisition activity by using a predetermined adjustment policy based on the average generation time of the blocks in the blockchain that are generated in the previous service qualification acquisition activity. The predetermined adjustment policy can be presented in the form of a table, an equation, or an algorithm.

The service platform can adjust, in a way other than the previous method, the result generation rule corresponding to each activity (each activity corresponds to the same service). For example, the service platform can adjust the result generation rule corresponding to the present service based on the specified number of users who can obtain qualification for executing the service in the present service qualification acquisition activity, or can adjust the result generation rule corresponding to the present service based on predicted duration of the present service qualification acquisition activity. Certainly, the result generation rule corresponding to the service can be adjusted in another way. Examples are not described here.

The service platform can combine a plurality of methods to adjust the result generation rule corresponding to the service. Regardless of a single method or a combination of methods, the service platform can adjust the result generation rule by using the predetermined adjustment policy.

The end-user device can save the qualification acquisition rule after receiving the qualification acquisition rule and the result generation rule that are returned by the service platform. The end-user device saves the qualification acquisition rule so that the end-user device can perform, by using the obtained qualification acquisition rule, qualification verification on a user who obtain the qualification for executing the service and who is subsequently published by the service platform.

The end-user device can generate a corresponding to-be-verified result according to the result generation rule after obtaining the result generation rule. For example, assume that the result generation rule obtained by the end-user device specifies that a value (namely, the to-be-verified result) generated by the end-user device needs to satisfy the following condition: A string of hash value whose first five bits are 0 is obtained after hash conversion is performed on the value. In this case, the end-user device performs successive operations according to the result generation rule by consuming calculation resources to obtain a value (namely, the to-be-verified result) that satisfies the result generation rule.

The end-user device can pack the to-be-verified result, the generation time of the to-be-verified result, and a user identifier into a preprocessing block after obtaining the to-be-verified result. The user identifier is used as a basis for the service platform to subsequently determine a user who is qualified to execute the service. The user identifier can be determined by the end-user device when the user complies the qualification acquisition request, or determined from user information entered on the end-user device.

For example, assume that the user identifier is a user account. When sending the qualification acquisition request, the end-user device can determine a user account used by the user to send the qualification acquisition request, and pack the user account as the user identifier into the preprocessing block when generating the preprocessing block.

Certainly, different from the user account, the user identifier can be, for example, an identity card number, a fingerprint code (a character string obtained by performing data conversion on a user fingerprint), or a user nickname (the user nickname needs to be unique). In addition to the user identifier, the end-user device can further add an identifier of the end-user device to the preprocessing block. Correspondingly, the service platform can determine, based on blocks in the blockchain, an end-user device that can obtain the qualification for executing the service from end-user devices that participate in the present service qualification acquisition activity. The identifier of the end-user device can be identification information that can uniquely identify the end-user device, such as the sequence number, Bluetooth address, or Media Access Control (MAC) address of the end-user device.

After obtaining the preprocessing block, the end-user device can send the preprocessing block to another end-user device that participates in the present service qualification acquisition activity, so that the another end-user device performs consensus processing on the preprocessing block. The another end-user device can perform consensus processing on the to-be-verified result included in the preprocessing block, and write the preprocessing block to a locally stored blockchain corresponding to the service after determining that a consensus is reached on the to-be-verified result.

In the present implementation of the present application, when the end-user device sends the qualification acquisition request to the service platform, the service platform can obtain an address of the end-user device, and save the address. Similarly, the service platform needs to obtain addresses of all end-user devices that participate in the present service qualification acquisition activity, so that the end-user device can send the preprocessing block to the another end-user device for a consensus based on the addresses obtained by the service platform, as shown in FIG. 2.

Figure 2:
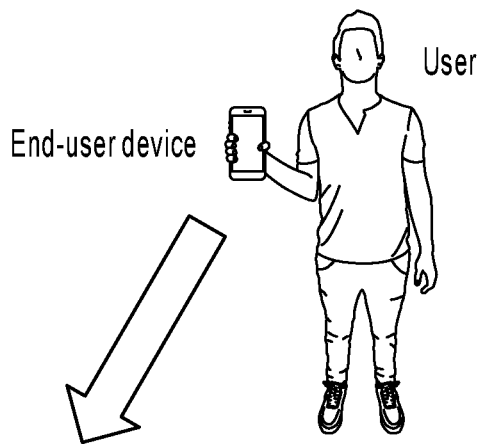
FIG. 2 is a schematic diagram illustrating obtaining an address of an end-user device by a service platform, according to an implementation of the present application.
Figure 2:
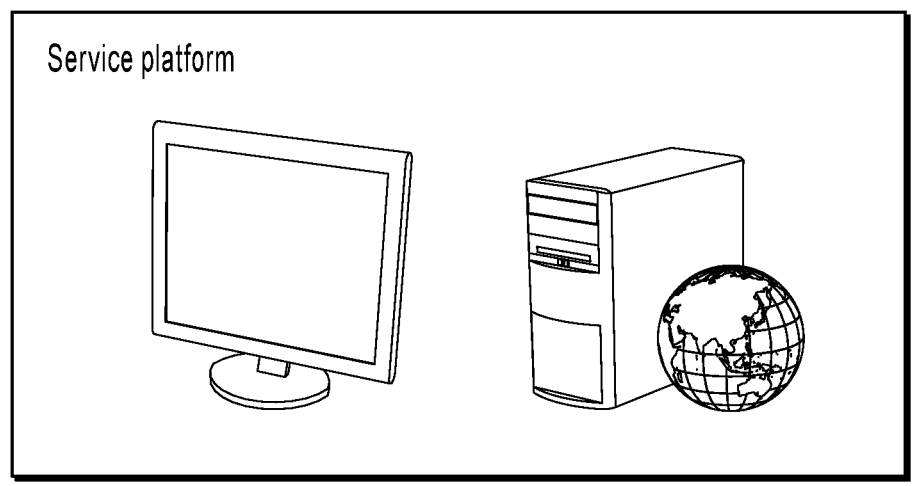
Figure 2:
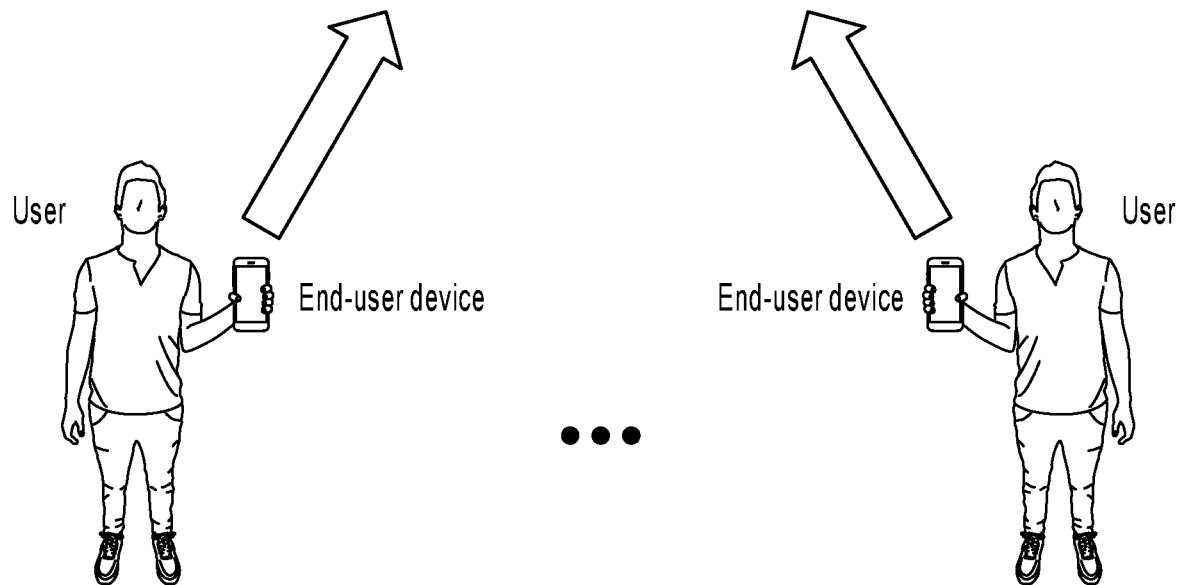

FIG. 2 is a schematic diagram illustrating obtaining an address of an end-user device by a service platform, according to an implementation of the present application.

In FIG. 2, when an end-user device sends the qualification acquisition request to the service platform, the service platform obtains the address of the end-user device, and saves the address. The end-user device can actively provide the address for the service platform. In other words, the end-user device can add the address to the qualification acquisition request. The service platform can obtain the address of the end-user device by parsing the qualification acquisition request, and save the address.

Certainly, the service platform can actively obtain the address of the end-user device from the end-user device. For example, the service platform can send an address query request to the end-user device after receiving the qualification acquisition request sent by the end-user device. The end-user device can return its address to the service platform after receiving the address query request.

The service platform can obtain the addresses of all the end-user devices that participate in the present service qualification acquisition activity, and save these addresses. In this case, when subsequently sending the preprocessing block to the another end-user device, the end-user device can first send the preprocessing block to the service platform, and then the service platform sends the preprocessing block to the another end-user device for a consensus based on the obtained addresses of the end-user devices. Certainly, the end-user device can obtain, from the service platform, the addresses of the end-user devices (namely, addresses of end-user devices that have participated in the present qualification acquisition activity at the current moment) that are obtained by the service platform, and then send the preprocessing block to the another end-user device for a consensus based on the obtained addresses.

When sending the preprocessing block to the another end-user device, the service platform sends the preprocessing block to an end-user device that has participated in the service qualification acquisition activity at the current moment. In practice, because users usually successively participate in the service qualification acquisition activity, the service platform can obtain only the addresses of the end-user devices that have participated in the service qualification acquisition activity at the current moment (namely, addresses of end-user devices that have sent the qualification acquisition requests to the service platform at the current moment).

Certainly, if an appointment can be made for the service qualification acquisition activity, in addition to the end-user device that has participated in the service qualification acquisition activity at the current moment, the service platform can send the preprocessing block to an end-user device that has not participated in the target qualification acquisition activity at the current moment but makes an appointment to participate in the present service qualification acquisition activity. Correspondingly, in the process of making an appointment, the end-user device that makes an appointment for the present service qualification acquisition activity need to send an address of the end-user device to the service platform for storage so that the service platform can send, based on the obtained address, the preprocessing block to the end-user device that makes an appointment for the present service qualification acquisition activity.

After receiving the preprocessing block, each end-user device that participates in the present service qualification acquisition activity can perform consensus processing on the to-be-verified result included in the preprocessing block, and store the preprocessing block as a blockchain block in the blockchain corresponding to the service after determining that a consensus is reached on the to-be-verified result. The end-user device can write, based on a generation time of each block, each block to the blockchain corresponding to the service, as shown in FIG. 3.

Figure 3:
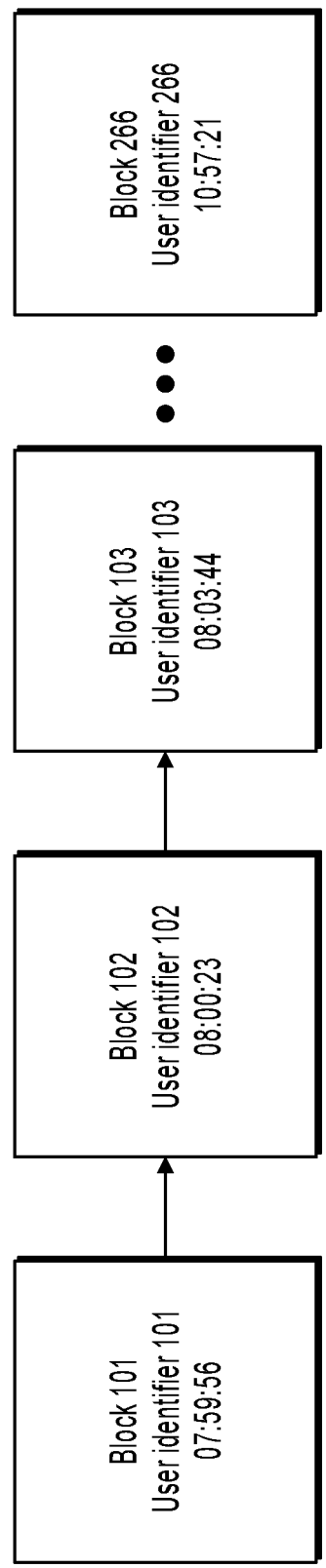
FIG. 3 is a schematic diagram illustrating a blockchain corresponding to a service, according to an implementation of the present application.

FIG. 3 is a schematic diagram illustrating a blockchain corresponding to a service, according to an implementation of the present application.

After determining that a consensus is reached on the preprocessing block, each end-user device that participates in consensus processing on the preprocessing block can write, based on the generation time of the to-be-verified result in the preprocessing block, the preprocessing block as a blockchain block to the blockchain corresponding to the service. Each block in the blockchain includes a user identifier of a user who generates the block (a preprocessing block can function as a blockchain block after a consensus is reached) by using an end-user device. In this case, after subsequently determining at least one block that satisfies the qualification acquisition rule from the blockchain, the service platform can finally determine, based on a user identifier included in the block, a user who obtains the qualification for executing the service.

It is worthwhile to note that in the present implementation of the present application, besides writing the preprocessing block on which a consensus is reached (the preprocessing block on which a consensus is reached can also be referred to as a blockchain block) to the blockchain corresponding to the service based on the generation time of the to-be-verified result, the end-user device can write the preprocessing block as a blockchain block to the blockchain based on a time sequence of the consensus reached on the preprocessing block, or can write the preprocessing block as a blockchain block to the blockchain based on the generation time of the preprocessing block. Alternatively, the end-user device that participates in consensus processing can write the preprocessing block on which a consensus is reached to the blockchain as a blockchain block according to another standard. Examples are not described here.

S103. When determining that the service satisfies a predetermined condition, obtain a blockchain from at least one end-user device, and select at least one block that satisfies the qualification acquisition rule from the blockchain.

When determining a block that satisfies the qualification acquisition rule, the service platform can detect whether the service satisfies the predetermined condition. When determining that the service satisfies the predetermined condition, the service platform can obtain the blockchain corresponding to the service from the at least one end-user device that participates in the service qualification acquisition activity, and determine the at least one block that satisfies the qualification acquisition rule from the blockchain.

The predetermined condition can be detecting whether a time specified for the service arrives. The specified time can be an end time of a qualification participation time period of the service qualification acquisition activity. The service qualification acquisition activity has a start time and an end time, where the end time can be understood as a time at which the service platform no longer receives or accepts a qualification acquisition request sent by an end-user device. The qualification participation time period of the service can be understood as a time period from the start time at which the service platform starts to determine a user who can obtain the qualification for executing the service to the end time. Therefore, the determining that the service satisfies a predetermined condition can mean that the service platform determines that the current moment is the end time of the qualification participation time period of the service.

Certainly, in the present implementation of the present application, the specified time can be a time other than the end time of the service qualification acquisition activity. For example, the specified time can be a generation time of a specified block in the blockchain corresponding to the service. Correspondingly, the determining that the service satisfies a predetermined condition can mean that the service platform obtains the blockchain corresponding to the service from the end-user device, and determines the generation time of the block located at the end of the blockchain at the current moment (the generation time is included in the block), and determines that the service satisfies the predetermined condition when determining that the generation time of the block is the time specified for the service. In addition, the specified time can be another form of time. Examples are not described here.

In the present implementation of the present application, the predetermined condition can refer to the number of blocks that is specified for the service. Correspondingly, the determining that the service satisfies a predetermined condition can mean that the service platform can determine the number of blocks included in the blockchain that corresponds to the service and that is obtained from the at least one end-user device participating in the service qualification acquisition activity, and can determine that the service satisfies the predetermined condition when determining that the number of blocks included in the blockchain is not less than the number of blocks that is specified for the service.

The predetermined condition for the service can be different from the previous two predetermined conditions. For example, the predetermined condition for the service can be whether the number of end-user devices that participate in the present service qualification acquisition activity satisfies the number of end-user devices that is specified for the service, in other words, whether the number of qualification acquisition requests that are sent by end-user devices and received by the service platform reaches the number specified for the service (one end-user device usually sends only one qualification acquisition request to the service platform). Correspondingly, the service platform can determine that the service satisfies the predetermined condition when determining that the number of end-user devices that send the qualification acquisition requests for the present service qualification acquisition activity to the service platform reaches the number of end-user devices that is specified for the service.

Certainly, the predetermined condition for the service can be in another form. The operation and maintenance personnel of the service platform can set different predetermined conditions based on actual needs. Examples are not described here.

When determining that the service satisfies the predetermined condition, the service platform can obtain the blockchain corresponding to the service from the at least one end-user device that participates in the present service qualification acquisition activity, and then determine the at least one block that satisfies the qualification acquisition rule from the blockchain.

The service platform can obtain, from a plurality of end-user devices that participate in the present service qualification acquisition activity, blockchains that correspond to the service and are saved by the end-user devices, select a main chain from the obtained blockchains, and then select the block that satisfies the qualification acquisition rule from blocks included in the main chain. The main chain can be the longest chain.

The service platform selects the longest chain because in practice, for blockchains that correspond to the service and are saved by different end-user devices, the longest chain records the maximum number of blocks generated in the present service qualification acquisition activity. Therefore, it is most effective for the service platform to determine the block that satisfies the qualification acquisition rule from the longest chain. In other words, no block is missed during selection.

Certainly, when the blockchain corresponding to the service includes a plurality of sidechains, the service platform can select a main chain from the plurality of sidechains after obtaining the blockchain corresponding to the service, and can subsequently select the at least one block that satisfies the qualification acquisition rule from the selected main chain. The longest chain (namely, the chain including the maximum number of blocks) can be selected from the plurality of sidechains in the blockchain as the main chain.

It is worthwhile to note that, in the present implementation of the present application, the main chain can be selected in a method other than the previously described method of selecting the longest chain. For example, after obtaining each blockchain corresponding to the service from each end-user device, the service platform can determine a generation time of a start block (namely, the first block that is generated after the present qualification acquisition activity starts and that is recorded in each blockchain) and a generation time of an end block (namely, the last block that is generated after the present qualification acquisition activity starts and that is recorded in each blockchain) in each blockchain in the present qualification acquisition activity. Then, the service platform can use a blockchain whose generation times of the start block and the end block are closest to the start time and end time of the present qualification acquisition activity (the start time and end time of the qualification acquisition activity are respectively the start time and end time of the qualification participation time period that are mentioned above) as the main chain.

The previously described method of determining the main chain is also applicable when the blockchain includes the plurality of sidechains. To be specific, the service platform determines a generation time of a start block and a generation time of an end block (the start block and the end block are recorded in each sidechain in the present qualification acquisition activity) included in each sidechain, and then selects a sidechain whose generation times of a start block and an end block are closest to the start time and end time of the qualification acquisition activity from the sidechains as the main chain. Certainly, the main chain can be determined in another way. Examples are not described here.

After obtaining the blockchain corresponding to the service, the service platform can determine the at least one block that satisfies the qualification acquisition rule from the blocks included in the blockchain. A specific determining method can be as follows: The service platform can determine a location of each block in the blockchain, and then the service platform can further determine whether the location of the block is a location, specified in the qualification acquisition rule, of a block that satisfies the qualification acquisition rule in the blockchain, and if yes, determine that the block satisfies the qualification acquisition rule.

For example, assume that the qualification acquisition rule corresponding to the service specifies that the third block, the 19th block, the 44th block, and the 88th block (the third, the 19th, the 44th, and the 88th are locations, specified in the qualification acquisition rule, of blocks that satisfy the qualification acquisition rule in the blockchain) in the blockchain (or the longest chain) satisfy the qualification acquisition rule. In this case, the service platform can select the four blocks from the blockchain (or the longest chain), then determine the four blocks as blocks that satisfy the qualification acquisition rule, and subsequently determine users corresponding to user identifiers included in the four blocks as users who obtain the qualification for executing the service.

Certainly, the qualification acquisition rule can specify, in a method other than the method of using a location of a block in the blockchain, the block that satisfies the qualification acquisition rule. For example, the qualification acquisition rule can specify, based on the time at which a block is added to the blockchain, whether the block in the blockchain satisfies the qualification acquisition rule. Alternatively, the qualification acquisition rule can specify, based on the generation time of a block (which can also be understood as the generation time of a preprocessing block) in the blockchain, whether the block satisfies the qualification acquisition rule. Certainly, the qualification acquisition rule can specify, in another way, whether a block in the blockchain satisfies the qualification acquisition rule. Examples are not described here.

In the present implementation of the present application, the service corresponds to one blockchain on each end-user device. The blockchain includes a preprocessing block (which can also be referred to as a blockchain block after a consensus is reached) generated by each end-user device based on the result generation rule in the service qualification acquisition activity. However, in practice, the service qualification acquisition activity can be held more than once. In other words, the service platform can hold a plurality of qualification acquisition activities for the same service. Therefore, the end-user device usually records blocks generated in all qualification acquisition activities of the service.

To enable the service platform to accurately determine at least one block that is generated in the present service qualification acquisition activity and that satisfies the qualification acquisition rule from the blockchain corresponding to the service, the service platform needs to determine blocks generated in the present service qualification acquisition activity, based on the generation time of a to-be-verified result (or the generation time of a block, where the generation time of the block can also be understood as the generation time of a preprocessing block) included in a block in the blockchain. In other words, the service platform needs to determine, from the blockchain, at least one block generated in the qualification participation time period of the present service.

Therefore, in the present implementation of the present application, the service platform can determine the blocks included in the obtained blockchain, and further determine generation times of to-be-verified results included in the blocks. Then, the service platform can determine, from these blocks based on the determined generation times of the to-be-verified results included in the blocks, a block generated in a time period specified for the service. The time period specified for the service can refer to the qualification participation time period of the present service qualification acquisition activity.

The service platform can determine, based on the generation times of the to-be-verified results included in the blocks, at least one block generated in the qualification participation time period of the present service in the obtained blockchain corresponding to the service, and further determine the at least one block as at least one block generated by at least one end-user device based on the result generation rule in the present service qualification acquisition activity.

Certainly, the previously described time period specified for the service can be different from the qualification participation time period. The operation and maintenance personnel of the service platform can set the specified time period based on an actual need. Examples are not described here.

The at least one block generated in the present service qualification acquisition activity in the blockchain corresponding to the service can be determined by using information that is included in the blocks and that is different from the generation times of the to-be-verified results included in the blocks. For example, assume that the end-user device further adds identification information of the result generation rule (or the qualification acquisition rule) obtained from the service platform to the generated preprocessing block. The service qualification acquisition activities can correspond to the same service but different result generation rules (or qualification acquisition rules). Correspondingly, different result generation rules (or qualification acquisition rules) can correspond to different identification information. Based on this, if the end-user device further adds the identification information of the result generation rule (or the qualification acquisition rule) corresponding to the present service qualification acquisition activity to the preprocessing block, the service platform can subsequently use the identification information of the result generation rule (or the qualification acquisition rule) included in the block (the preprocessing block functions as a blockchain block after a consensus is reached, and is written to the blockchain corresponding to the service) to determine at least one block corresponding to the present service qualification acquisition activity.

In addition, the service platform can determine, in another way, the block corresponding to the present service qualification acquisition activity. For example, each of different qualification acquisition activities held for the same service corresponds to one activity identifier. When generating the preprocessing block, the end-user device can add the activity identifier to the preprocessing block. In this case, the service platform can subsequently use the activity identifier included in the block (after a consensus is reached, the preprocessing block is written as a blockchain block to the blockchain corresponding to the service) to determine at least one block generated in the present service qualification acquisition activity. Certainly, the block generated in the present service qualification acquisition activity can be determined in another way. Examples are not described here.

It is worthwhile to note that in the present implementation of the present application, because the service platform can obtain an address of the end-user device when the end-user device sends the qualification acquisition request to the service platform, the service platform can obtain, based on at least one previously obtained address, the blockchain corresponding to the service from the at least one end-user device that participates in the present service qualification acquisition activity, and further determine the at least one block that satisfies the qualification acquisition rule from the blockchain.

S104. Execute the service for a user that corresponds to a user identifier included in the at least one block.

After determining the at least one block that satisfies the qualification acquisition rule from the obtained blockchain corresponding to the service, the service platform can determine, based on the user identifier included in the block, a user who obtains the qualification for executing the service, and further execute the service for the determined user. The user who obtains the qualification for executing the service can execute the service by using the service platform.

In addition, the service platform can further publish the user identifier included in the at least one block that satisfies the qualification acquisition rule, so that another user that participates in the present service qualification acquisition activity can use an end-user device to view the result published by the service platform. After viewing the result published by the service platform, the user can verify the result by using the end-user device to determine whether the result published by the service platform is true and valid.

After obtaining the user identifier, published by the service platform, of the user who obtains the qualification for executing the service, the end-user device can determine the at least one block that satisfies the qualification acquisition rule from the blockchain based on the blockchain that corresponds to the service and that is saved by the end-user device and the qualification acquisition rule previously obtained from the service platform, and further determine the user identifier included in the at least one block. The end-user device can compare the user identifier, determined by the end-user device, of the user who obtains the qualification for executing the service, with the user identifier obtained from the service platform. The end-user device can determine that the result published by the service platform is true and valid when determining that the user identifier determined by the end-user device is consistent with the user identifier published by the service platform. Otherwise, the end-user device can determine that the service platform commits fraud in the present service qualification acquisition activity.

It can be seen from the previous method that because each end-user device can write a to-be-verified result generated according to the result generation rule to the blockchain corresponding to the service, each end-user device can use the blockchain that corresponds to the service and that is saved by the end-user device to view a block generated by another end-user device. In addition, the service platform can send the qualification acquisition rule for obtaining the qualification for executing the service to each end-user device so that the end-user device can verify, based on the obtained qualification acquisition rule and the blockchain that corresponds to the service and that is saved by the end-user device, the result published by the service platform. For a user, the service platform can be effectively prevented from committing fraud in the process of determining the user who can obtain the qualification for executing the service, thereby protecting user rights and interests. For the service platform, an effective verification method is provided for the user, thereby improving the credibility of the service platform.

Figure 4:
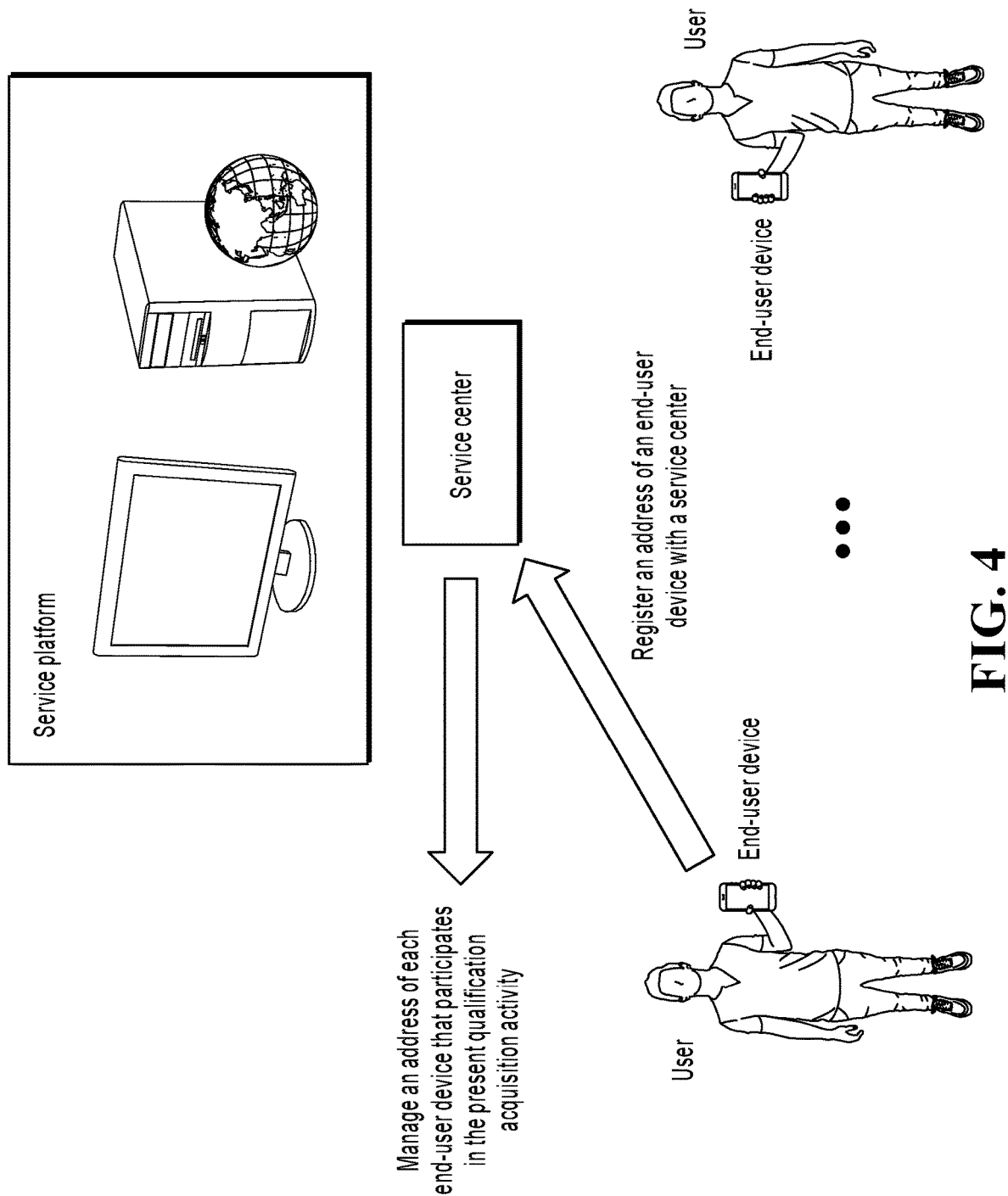
FIG. 4 is a schematic diagram illustrating address management by a service center, according to an implementation of the present application.

It is worthwhile to note that in the present implementation of the present application, a dedicated service center may be responsible for managing the address of each end-user device that participates in the present service qualification acquisition activity, as shown in FIG. 4.

FIG. 4 is a schematic diagram illustrating address management by a service center, according to an implementation of the present application.

In the present implementation of the present application, when sending the qualification acquisition request to the service platform by using an end-user device, each user who participates in the present service qualification acquisition activity can first send an address of the end-user device to the service center. Correspondingly, the service center can save the address sent by the end-user device after receiving the address.

Certainly, the service center can actively obtain the address of the end-user device. The end-user device can first send the qualification acquisition request to the service center, and then the service center sends the qualification acquisition request to the service platform. After receiving the qualification acquisition request sent by the end-user device, the service center can send an address query message to the end-user device so that the end-user device can actively send the address of the end-user device to the service center after receiving the query message. The service center can actively obtain the corresponding address from the end-user device and save the address after receiving the qualification acquisition request sent by the end-user device. In addition, the end-user device can add the address of the end-user device to the qualification acquisition request and send the qualification acquisition request to the service center. The service center parses the qualification acquisition request to obtain the address of the end-user device.

In a consensus process of a preprocessing block (also referred to as a consensus process of a to-be-verified result), the end-user device can obtain, from the service center, the addresses of the end-user devices that participate in the present service qualification acquisition activity at the current moment (if an appointment can be made for the present service qualification acquisition activity, these end-user devices include an end-user device making an appointment), and then send the preprocessing block generated by the end-user device to the end-user devices corresponding to the addresses for a consensus.

Certainly, the end-user device can send the preprocessing block to the service center. The service center can send, based on the obtained addresses of the end-user devices that participate in the present service qualification acquisition activity at the current moment, the preprocessing block to the end-user devices corresponding to the addresses for a consensus.

It is worthwhile to note that, in the present implementation of the present application, the service platform or the service center can save user identifiers (such as user accounts) of users who participate in the present service qualification acquisition activity, instead of saving the addresses of the end-user devices that participate in the present service qualification acquisition activity. In this case, the service platform or the service center can subsequently send, based on the previously obtained user identifiers (the user identifiers of the users who participate in the present service qualification acquisition activity at the current moment), the preprocessing block to the end-user devices currently used by the users to participate in the present service qualification acquisition activity by using the user identifiers.

Certainly, the service platform or the service center can send the previously obtained user identifiers of the users who participate in the present service qualification acquisition activity at the current moment to the end-user device so that the end-user device sends, based on the obtained user identifiers, the preprocessing block generated by the end-user device to the end-user devices currently used by the users to participate in the present service qualification acquisition activity by using the user identifiers.

In step S104, when each end-user device determines, based on the blockchain that corresponds to the service and that is saved by the end-user device and the qualification acquisition rule obtained from the service platform, that the result published by the service platform is not true and valid (in other words, the user corresponding to the at least one user identifier published by the service platform is not qualified to execute the service), the end-user devices can jointly initiate a notification that the service platform commits fraud in the present service qualification acquisition activity to a third-party certification authority. In other words, when determining that the result published by the service platform is not true and valid, each end-user device that participates in the present service qualification acquisition activity can initiate the notification that the service platform commits fraud in the present service qualification acquisition activity to the third-party certification authority.

When determining that the number of received notifications that the service platform commits fraud in the present service qualification acquisition activity reaches a specified number, the third-party certification authority can determine that the result published by the service platform for the present service qualification acquisition activity is not true, and then determine that the result published by the service platform is invalid, and hold the service platform accountable.

In the present implementation of the present application, the end-user device can send, to each end-user device in a consensus network (namely, an end-user device that participates in the qualification acquisition activity of the target service at the current moment) for a consensus, the to-be-verified result obtained according to the result generation rule sent by the service platform. After a consensus is reached on the to-be-verified result, the end-user device writes the to-be-verified result to the block that includes the user identifier, and sends the block to each end-user device in the consensus network. Each end-user device can write the block to a blockchain corresponding to the target service.

When receiving the service qualification acquisition request sent by each end-user device, the service platform may receive a large number of service qualification acquisition requests in a short time period. Therefore, after receiving some service qualification acquisition requests, the service platform can randomly group these service qualification acquisition requests into several batches, and then return, at a specified time interval, the corresponding qualification acquisition rule and result generation rule to end-user devices corresponding to one batch of service qualification acquisition requests, instead of immediately returning the qualification acquisition rule and the result generation rule to the end-user devices.

In practice, a block header of a current block in the blockchain includes a header hash of a previous block. In this way, the blocks are head-to-tail connected. A service platform may receive, in a short time period, a large number of service qualification acquisition requests sent by end-user devices when the qualification acquisition activity of the target service starts. When the end-user devices obtain the corresponding to-be-verified results and to-be-verified blocks according to the result generation rule returned by the service platform, header hashes of previous blocks included in the to-be-verified blocks can be header hashes of the same block. Consequently, a large number of sidechains appear.

In the present implementation of the present application, to effectively alleviate appearance of the sidechains, after receiving a large number of service qualification acquisition requests, the service platform can randomly group these service qualification acquisition requests, and return, at a specified time interval, the corresponding qualification acquisition rule and result generation rule to end-user devices corresponding to one batch of service qualification acquisition requests, instead of immediately returning the corresponding qualification acquisition rule and result generation rule to the end-user devices. In this case, a batch of end-user devices that first receive the qualification acquisition rule and the result generation rule that are returned by the service platform can first write blocks that are generated by the end-user devices and on which a consensus is reached to the blockchain because of a time advantage. The current batch of end-user devices can generate to-be-verified blocks according to the result generation rule and based on blocks generated by the previous batch of end-user devices. In other words, blocks generated by each batch of end-user devices can include header hashes of blocks generated by the previous batch of end-user devices. As such, the appearance of sidechains can be alleviated to some extent, and complexity can be reduced to some extent.

When the sidechains are equal in length, and the end-user device needs to subsequently write the block that is generated by the end-user device and on which a consensus is reached to the blockchain based on the sidechains, the end-user device can randomly select a sidechain from these sidechains, and write the header hash of the currently last block in the sidechain to the preprocessing block when generating the preprocessing block. In this case, when a consensus is reached on the preprocessing block, each end-user device (each end-user device that currently participates in the present qualification acquisition activity and can include an end-user device that makes an appointment) can determine, based on a header hash of a previous block included in the preprocessing block, a sidechain that the block corresponding to the header hash is located in, and further write the preprocessing block as a blockchain block to the sidechain.

In the present implementation of the present application, when each end-user device that participates in the present qualification acquisition activity at the current moment performs consensus processing on a preprocessing block sent by a certain end-user device, once it is determined that a consensus is reached on the preprocessing block, the end-user device can ignore (or delete) preprocessing blocks sent by another end-user device and the end-user device itself in the process of consensus processing on the preprocessing block, instead of writing the preprocessing block as a blockchain block to the blockchain corresponding to the service. In this case, the another end-user device and the end-user device generate new to-be-verified results according to the result generation rule obtained from the service platform, add the to-be-verified results to newly generated preprocessing blocks, and send the newly generated processing blocks to each end-user device in the consensus network for a consensus. As such, the possibility of generating a sidechain in the blockchain can be further reduced.

In the present qualification acquisition activity, the end-user devices can obtain the same result generation rule. Therefore, when performing consensus processing on the preprocessing block, in addition to verifying the to-be-verified result included in the preprocessing block to determine whether the to-be-verified result satisfies the result generation rule, each end-user device can further verify whether the to-be-verified result is the same as a to-be-verified result included in a preprocessing block in a previous consensus process, and verify whether a time interval between the generation time of the to-be-verified result and the generation time of the to-be-verified result included in the preprocessing block in the previous consensus process satisfies a specified time interval. If it is verified that the to-be-verified result is the same as the to-be-verified result included in the preprocessing block in the previous consensus process, and the time interval between the generation time of the to-be-verified result and the generation time of the to-be-verified result included in the preprocessing block in the previous consensus process does not satisfy the specified time interval, it can be determined that the end-user device that generates the to-be-verified result commits plagiarism. In other words, the end-user device may directly obtain the to-be-verified result from a block on which a consensus is previously reached, without consuming calculation resources and time. In this case, the end-user devices in the consensus network cannot reach a consensus on the preprocessing block that includes the to-be-verified result.

It is worthwhile to further note that, in the present implementation of the present application, some content involved in the service execution process is described by using a commodity limited-time-offer scenario as an example to clearly describe in detail the service execution process provided in the present application. However, the service execution method provided in the present implementation of the present application is not limited to the commodity limited-time-offer scenario, and is also applicable to other scenarios similar to the commodity limited-time-offer scenario, such as commodity lottery drawing and license plate lottery drawing. Service execution processes involved in these scenarios are basically the same as the service execution process provided in the present application. Details are omitted here for simplicity.

The service execution method provided in the implementation of the present application is described above. Based on the same idea, implementations of the present application further provide two service execution devices, as shown in FIG. 5 and FIG. 6.

Figure 5:
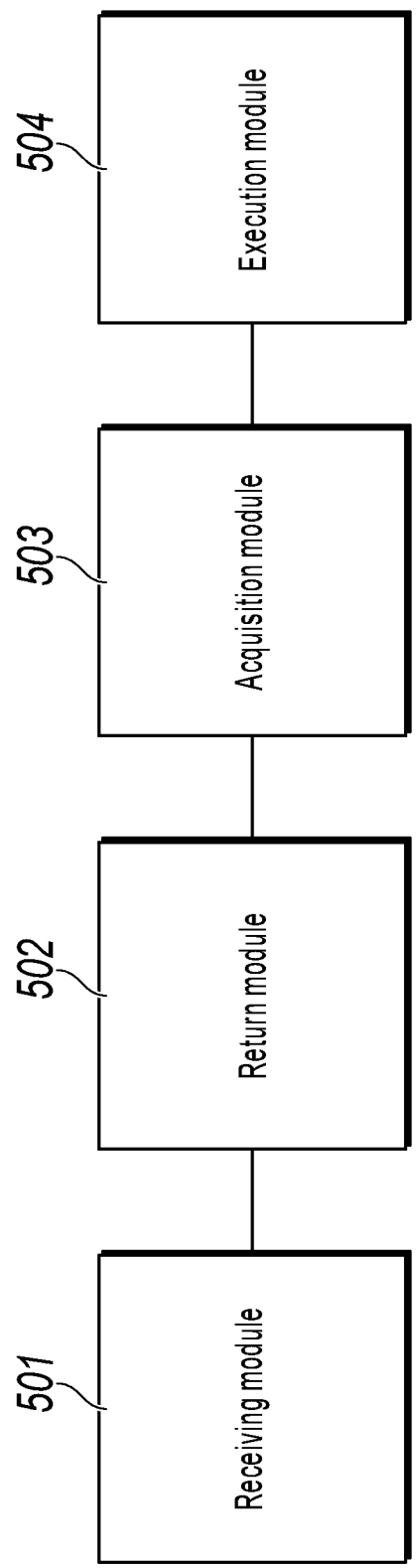
FIG. 5 is a schematic diagram illustrating a service execution device, according to an implementation of the present application.
Figure 6:
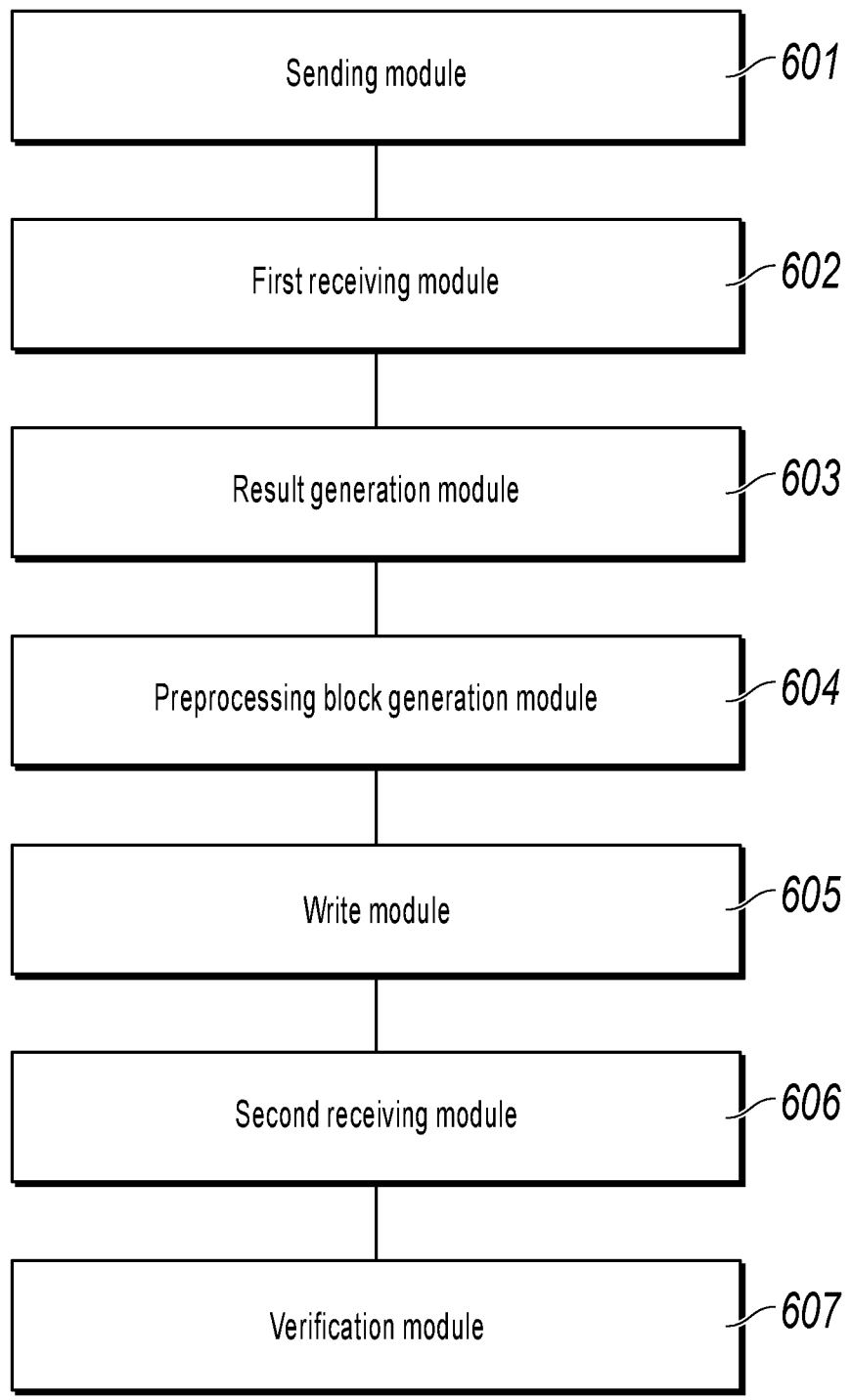
FIG. 6 is a schematic diagram illustrating another service execution device, according to an implementation of the present application.

FIG. 5 is a schematic diagram illustrating a service execution device, according to an implementation of the present application. The service execution device includes the following: a receiving module 501, configured to receive a qualification acquisition request sent by an end-user device for a service; a return module 502, configured to return a qualification acquisition rule and a result generation rule to the end-user device based on the qualification acquisition request so that the end-user device generates a to-be-verified result corresponding to the result generation rule, performs consensus processing on a preprocessing block that includes the to-be-verified result and a user identifier, and writes the preprocessing block as a blockchain block to a blockchain after a consensus is reached; an acquisition module 503, configured to, when determining that the service satisfies a predetermined condition, obtain a blockchain from at least one end-user device, and select at least one block that satisfies the qualification acquisition rule from the blockchain; and an execution module 504, configured to execute the service for a user that corresponds to a user identifier included in the at least one block.

The acquisition module 503 determines that the service satisfies the predetermined condition when determining that a specified time of the service arrives; and/or obtains the blockchain corresponding to the service from the at least one end-user device, determines the number of blocks included in the blockchain, and determines that the service satisfies the predetermined condition when determining that the number is not less than the number of blocks that is specified for the service.

The acquisition module 503 selects a main chain from the blockchain; and selects the at least one block that satisfies the qualification acquisition rule from the main chain.

The acquisition module 503 selects the longest chain in the blockchain as the main chain.

The acquisition module 503 determines a location of each block in the blockchain; and determines that the block satisfies the qualification acquisition rule when determining that the location of the block in the blockchain is specified in the qualification acquisition rule.

The preprocessing block includes a generation time of the to-be-verified result.

The acquisition module 503 determines, based on a generation time of a to-be-verified result included in each block in the blockchain, at least one block generated in a time specified for the service; and selects the at least one block that satisfies the qualification acquisition rule from the at least one determined block.

The execution module 504 publishes the user identifier included in the at least one block.

FIG. 6 is a schematic diagram illustrating another service execution device, according to an implementation of the present application. The service execution device includes the following: a sending module 601, configured to send a qualification acquisition request to a service platform for a service; a first receiving module 602, configured to receive a qualification acquisition rule and a result generation rule that are returned by the service platform based on the qualification acquisition request; a result generation module 603, configured to generate a corresponding to-be-verified result according to the result generation rule; a preprocessing block generation module 604, configured to generate a preprocessing block that includes the to-be-verified result and a user identifier, and send the preprocessing block to another end-user device so that the another end-user device performs consensus processing on the preprocessing block; a write module 605, configured to write the preprocessing block as a blockchain block to a blockchain included in the device after it is determined that the another end-user device reaches a consensus on the preprocessing block; and a second receiving module 606, configured to send the blockchain saved by the device to the service platform when receiving qualification confirmation information sent by the service platform, so that the service platform selects at least one block that satisfies the qualification acquisition rule from the blockchain, and executes the service for a user that corresponds to a user identifier included in the at least one block.

The preprocessing block generation module 604 generates the corresponding to-be-verified result according to the result generation rule; and generates the preprocessing block that includes the to-be-verified result, the user identifier, and a generation time of the to-be-verified result.

The preprocessing block generation module 604 obtains an address of the another end-user device from the service platform, where the address of the another end-user device is obtained from the another end-user device when the service platform receives a qualification acquisition request sent by the another end-user device for the service; and sends the preprocessing block to the another end-user device based on the obtained address of the another end-user device.

The device further includes a verification module 607, configured to obtain at least one user identifier published by the service platform; and verify, based on the blockchain and the qualification acquisition rule, whether a user corresponding to the at least one user identifier is qualified to execute the service.

In the implementations of the present application, after receiving a qualification acquisition request sent by each end-user device for the service, the service platform can return the qualification acquisition rule and the result generation rule to each end-user device. Each end-user device can generate a corresponding to-be-verified result according to the result generation rule returned by the service platform, then add the to-be-verified result and a user identifier of a user who uses the end-user device to a preprocessing block, and send the preprocessing block to another end-user device, and write the preprocessing block as a blockchain block to a blockchain that corresponds to the service and that is saved by the end-user device, after determining that the another end-user device reaches a consensus on the preprocessing block. When determining a user who can obtain the qualification for executing the service, the service platform can obtain a blockchain corresponding to the service from at least one end-user device, determine, based on the obtained blockchain, a block that satisfies the qualification acquisition rule, and then execute, based on a user identifier included in the block, the service for the user corresponding to the user identifier. Because each end-user device can write the to-be-verified result generated according to the result generation rule to the blockchain corresponding to the service, each end-user device can use the blockchain that corresponds to the service and that is saved by the end-user device to view a block generated by another end-user device. In addition, the service platform can send the qualification acquisition rule for obtaining the qualification for executing the service to each end-user device so that the end-user device can verify, based on the obtained qualification acquisition rule and the blockchain that corresponds to the service and that is saved by the end-user device, a user identifier of a user who can execute the service and who is determined by the service platform. For a user, the service platform can be effectively prevented from committing fraud in the process of determining the user who can obtain the qualification for executing the service, thereby protecting user rights and interests. For the service platform, an effective verification method is provided for the user, thereby improving the credibility of the service platform.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be, for example, a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicon Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Or the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the device above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in the present specification, the computer readable medium does not include computer-readable transitory media such as a modulated data signal and a carrier.

It is worthwhile to further note that the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. An element described by "includes a . . . " further includes, without more constraints, another same or identical element in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, reference can be made to related descriptions in the method implementation.

The previous descriptions are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Implementations of the present application can solve technical problems in executing service for users. Traditionally, to execute a service, for example, a commodity limited-time-offer activity (flash sale), a service platform that provides the commodity limited-time-offer activity can first receive, from each user and in a time period specified for a commodity limited-time-offer activity, a commodity limited-time-offer qualification acquisition request. The service platform selects a specified number of users from these users, and grants the commodity limited-time-offer qualification to these selected users. Generally, the service platform determines the first several users who send the requests as users who can obtain the commodity limited-time-offer qualification. Alternatively, the service platform can randomly select a certain number of users based on a predetermined rule, and publish the determined users who obtain the commodity limited-time-offer qualification.

However, the process of the service platform selecting and determining the users that can obtain the qualification for executing the service is not transparent to users. Therefore, it can be difficult for the service platform to prove it fairly and effectively executes the service. From a user's perspective, the user may suspect that the service platform commits fraud in the process of determining the users who obtain the qualification for executing the service. Therefore, a result published by the service platform is usually unconvincing for the user. What is needed is a technique to bypass these problems in the conventional methods, and providing a more effective and transparent mechanism between the service platform and users to ensure the service can be executed fairly and equitably.

Implementation of the present application provide methods and apparatuses for improving service execution between the service platform and the users. According to these implementations, users obtain, by using end-user devices, the qualification by generating a block of a blockchain that satisfies a qualification acquisition rule and a result generation rule determined by the service platform in advance. Specifically, an end-user device first generates a to-be-verified result based on the result generation rule. The end-user device then packs the to-be-verified result into a preprocessing block and sends the preprocessing block to another end-user device, so that the another end-user device can perform a consensus processing on the to-be-verified result included in the preprocessing block. If a consensus is reached, that end-user device writes the preprocessing block to a locally stored blockchain corresponding to the service. If the service platform determines that the service satisfies a predetermined condition, it can obtain a blockchain from at least one end-user device, select at least one block that satisfies the qualification acquisition rule from the blockchain, and execute the service for a user corresponding to a user identifier included in the at least one block.

In some implementations, because each end-user device can write a to-be-verified result generated according to the result generation rule to the blockchain corresponding to the service, each end-user device can use the blockchain that corresponds to the service and that is saved by the end-user device to view a block generated by another end-user device. In addition, the service platform can send the qualification acquisition rule for obtaining the qualification for executing the service to each end-user device so that the end-user device can verify, based on the obtained qualification acquisition rule and the blockchain that corresponds to the service and that is saved by the end-user device, the result published by the service platform. For a user, the service platform can be effectively prevented from committing fraud in the process of determining the user who can obtain the qualification for executing the service, thereby protecting user rights and interests. For the service platform, an effective verification method is provided for the user, thereby improving the credibility of the service platform.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a service platform and from each of a plurality of end-user devices of a plurality of users, a respective qualification acquisition request to qualify a respective first user associated with a respective end-user device from the plurality of users for execution of a respective service that is provided by the service platform, the plurality of end-user devices being nodes of a blockchain of a plurality of blockchains that corresponds to the service;
   randomly grouping, by the service platform, the qualification acquisition requests received from each of the plurality of end-user devices into multiple batches;
   for each batch in the multiple batches and based on the qualification acquisition requests in the batch, transmitting, at a time specified for the batch, by the
service platform and to the each end-user device of
the batch, (i) a qualification acquisition rule for
qualifying users for execution of the respective service, and (ii) a result generation rule that specifies a
calculation to generate a to-be-verified result corresponding to the batch to each end-user device corresponding to the batch; wherein,
  a) the batch of end-user devices that receive the
    qualification acquisition rule and result generation
    rule from the service platform i) generate a to-be-
    verified result corresponding to the result generation rule ii) perform consensus processing on a
    preprocessing block that comprises the to-be-verified result and a user identifier, and iii) write the
    preprocessing block as a blockchain block to the
    blockchain after a consensus is reached; and
  b) subsequent batches of end-user devices generate
    to-be-verified blocks according to the result generation rule and based on blocks generated by a
    previous batch of end-user devices, wherein
    blocks generated by each batch of end-user
    devices comprise header hashes of blocks generated by a previous batch of end-user devices;
obtaining, by the service platform, a blockchain from at
least one of the plurality of end-user devices, each
block in the blockchain including a user identifier of a
corresponding user who generated the block using an
end-user device of the plurality of end-user devices;
and
selecting, by the service platform based on the qualification acquisition rule, a first user from the plurality of
users, wherein selecting the first user is a part of a
selection process in which a set of users associated with
a set of end-user devices is selected from the plurality
of users, wherein selecting the first user further comprises,
  determining that at least one block in the blockchain
    satisfies the qualification acquisition rule, and for
    each block in the blockchain that satisfies the qualification acquisition rule,
  determining the user corresponding to the user identifier in each block in the blockchain that satisfies the
    qualification acquisition rule as a user who obtains
    qualification for execution of the service,
at least one further end-user device of the plurality of
end-user devices, performing consensus processing on
a preprocessing block that comprises the to-be-verified
result and the user identifier;
writing the preprocessing block the blockchain after consensus is reached; and
executing, by the service platform, a transaction within
the service for the qualified user in response to writing
of the preprocessing block indicating the result to the
blockchain.

2. The computer-implemented method of claim 1, wherein the service is a limited-time offer on one or more commodities, wherein the plurality of users are competing for availing the service.

3. The computer-implemented method of claim 1, wherein each blockchain of the plurality of blockchains corresponds to a different respective service.

4. The computer-implemented method of claim 1, wherein the qualification acquisition rule includes a condition that an end-user device has generated a preset number of specific blocks in the blockchain, wherein the service platform selects the first user from the plurality of users based on the qualification acquisition rule when the condition is satisfied.

5. The computer-implemented method of claim 1, further comprising:
  transmitting, by the service platform, the qualification
    acquisition rule to the plurality of end-user devices to
    allow the plurality of users to verify transparency of a
    selection process.

6. The computer-implemented method of claim 1, wherein the qualification acquisition rule that includes a condition that an end-user device has generated one or more blocks within the blockchain within one or more preset time-ranges, wherein the service platform selects the first user from the plurality of users based on the qualification acquisition rule when the condition is satisfied.

7. A non-transitory, computer-readable medium storing one or more instructions executable by a computer system to perform operations, comprising:
  receiving, by a service platform and from each of a
    plurality of end-user devices of a plurality of users, a
    respective qualification acquisition request to qualify a
    respective user associated with a respective first end-
    user device from the plurality of users for execution of
    a respective service that is provided by the service
    platform, the plurality of end-user devices being nodes
    of a blockchain of a plurality of blockchains that
    corresponds to the service;
  randomly grouping, by the service platform, the qualification acquisition requests received from each of the
    plurality of end-user devices into multiple batches;
  for each batch in the multiple batches and based on the
    qualification acquisition requests in the batch,
    transmitting, at a time specified for the batch, by the
      service platform and to each end-user device of the
      batch, (i) a qualification acquisition rule for qualifying users for execution of the respective service, and
      (ii) a result generation rule that specifies a calculation to generate a to-be-verified result corresponding
      to the batch to each end-user device corresponding to
      the batch; wherein,
      a) the batch of end-user devices that receive the
        qualification acquisition rule and result generation
        rule from the service platform i) generate a to-be-
        verified result corresponding to the result generation rule ii) perform consensus processing on a
        preprocessing block that comprises the to-be-verified result and a user identifier, and iii) write the
        preprocessing block as a blockchain block to the
        blockchain after a consensus is reached; and
      b) subsequent batches of end-user devices generate
        to-be-verified blocks according to the result generation rule and based on blocks generated by a
        previous batch of end-user devices, wherein
        blocks generated by each batch of end-user
        devices comprise header hashes of blocks generated by a previous batch of end-user devices;
  obtaining, by the service platform, a blockchain from at
    least one of the plurality of end-user devices, each
    block in the blockchain including a user identifier of a
    corresponding user who generated the block using an
    end-user device of the plurality of end-user devices;
    and
  selecting, by the service platform based on the qualification acquisition rule, a first user from the plurality of
    users, wherein selecting the first user is a part of a
    selection process in which a set of users associated with a set of end-user devices is selected from the plurality of users, wherein selecting the first user further comprises,
    determining that at least one block in the blockchain satisfies the qualification acquisition rule, and for each block in the blockchain that satisfies the qualification acquisition rule,
    determining the user corresponding to the user identifier in each block in the blockchain that satisfies the qualification acquisition rule as a user who obtains qualification for execution of the service,
at least one further end-user device of the plurality of end-user devices, performing consensus processing on a preprocessing block that comprises the to-be-verified result and the user identifier;
writing the preprocessing block the blockchain after consensus is reached; and
executing, by the service platform, a transaction within the service for the qualified user in response to writing of the preprocessing block indicating the result to the blockchain.

8. The non-transitory, computer-readable medium of claim 7, wherein the service is a limited-time offer on one or more commodities, wherein the plurality of users are competing for availing the service.

9. The non-transitory, computer-readable medium of claim 7, wherein each blockchain of the plurality of blockchains corresponds to a different respective service.

10. The non-transitory, computer-readable medium of claim 7, wherein the qualification acquisition rule includes a condition that an end-user device has generated a preset number of specific blocks in the blockchain, wherein the service platform selects the first user from the plurality of users based on the first qualification acquisition rule when the condition is satisfied.

11. The non-transitory, computer-readable medium of claim 7, wherein the operations further comprise:
    transmitting, by the service platform, the qualification acquisition rule to the plurality of end-user devices to allow the plurality of users to verify transparency of a selection process.

12. The non-transitory, computer-readable medium of claim 7, wherein the qualification acquisition rule that includes a condition that an end-user device has generated one or more blocks within the blockchain within one or more preset time-ranges, wherein the service platform selects the first user from the plurality of users based on the qualification acquisition rule when the condition is satisfied.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
    receiving, by a service platform and from each of a plurality of end-user devices of a plurality of users, a respective qualification acquisition request to qualify a respective user associated with a respective end-user device from the plurality of users for execution of a respective service that is provided by the service platform, the plurality of end-user devices being nodes of a blockchain of a plurality of blockchains that corresponds to the service;
    randomly grouping, by the service platform, the qualification acquisition requests received from each of the plurality of end-user devices into multiple batches;
    for each batch in the multiple batches and based on the qualification acquisition requests in the batch,
        transmitting, at a time specified for the batch, by the service platform and to each end-user device of the batch, (i) a qualification acquisition rule for qualifying users for execution of the respective service, and (ii) a result generation rule that specifies a calculation to generate a to-be-verified result corresponding to the batch to each end-user device corresponding to the batch; wherein,
            a) the batch of end-user devices that receive the qualification acquisition rule and result generation rule from the service platform i) generate a to-be-verified result corresponding to the result generation rule ii) perform consensus processing on a preprocessing block that comprises the to-be-verified result and a user identifier, and iii) write the preprocessing block as a blockchain block to the blockchain after a consensus is reached; and
            b) subsequent batches of end-user devices generate to-be-verified blocks according to the result generation rule and based on blocks generated by a previous batch of end-user devices, wherein blocks generated by each batch of end-user devices comprise header hashes of blocks generated by a previous batch of end-user devices;
    obtaining, by the service platform, a blockchain from at least one of the plurality of end-user devices, each block in the blockchain including a user identifier of a corresponding user who generated the block using an end-user device of the plurality of end-user devices; and
    selecting, by the service platform based on the qualification acquisition rule, a first user from the plurality of users, wherein selecting the first user is a part of a selection process in which a set of users associated with a set of end-user devices is selected from the plurality of users, wherein selecting the first user further comprises,
        determining that at least one block in the blockchain satisfies the qualification acquisition rule, and for each block in the blockchain that satisfies the qualification acquisition rule,
        determining the user corresponding to the user identifier in each block in the blockchain that satisfies the qualification acquisition rule as a user who obtains qualification for execution of the service,
    at least one further end-user device of the plurality of end-user devices, performing consensus processing on a preprocessing block that comprises the to-be-verified result and the user identifier;
    writing the preprocessing block the blockchain after consensus is reached; and
    executing, by the service platform, a transaction within the service for the qualified user in response to writing of the preprocessing block indicating the result to the blockchain.

14. The computer-implemented system of claim 13, wherein the service is a limited-time offer on one or more commodities, wherein the plurality of users are competing for availing the service.

15. The computer-implemented system of claim 13, wherein each blockchain of the plurality of blockchains corresponds to a different respective service.

16. The computer-implemented system of claim 13, wherein the qualification acquisition rule includes a condition that an end-user device has generated a preset number of specific blocks in the blockchain, wherein the service platform selects the first user from the plurality of users based on the qualification acquisition rule when the condition is satisfied.

17. The computer-implemented system of claim 13, wherein the operations further comprise:
   transmitting, by the service platform, the qualification acquisition rule to the plurality of end-user devices to allow the plurality of users to verify transparency of a selection process.

18. The computer-implemented system of claim 13, wherein the qualification acquisition rule that includes a condition that an end-user device has generated one or more blocks within the blockchain within one or more preset time-ranges, wherein the service platform selects the first user from the plurality of users based on the qualification acquisition rule when the condition is satisfied.

* * * * *

UNITED STATES PATENT AND TRADEMARK OFFICE
CERTIFICATE OF CORRECTION

PATENT NO. : 11,188,961 B2
APPLICATION NO. : 16/664020
DATED : November 30, 2021
INVENTOR(S) : Qiang Tang It is certified that error appears in the above-identified patent and that said Letters Patent is hereby corrected as shown below:

In the Claims

Column 28/Line 57 – In Claim 1, after "respective" delete "first".

Column 30/Line 23 – In Claim 7, after "respective" delete "first".

Column 31/Line 34 – In Claim 10, after "respective" delete "first".

Signed and Sealed this
Third Day of May, 2022

Katherine Kelly Vidal
*Director of the United States Patent and Trademark Office*